Patented Nov. 1, 1932

1,885,172

UNITED STATES PATENT OFFICE

FRITZ BAUMANN, OF LEVERKUSEN-ON-THE-RHINE, GERMANY, ASSIGNOR TO GENERAL ANILINE WORKS, INC., OF NEW YORK, N. Y., A CORPORATION OF DELAWARE

NEW DERIVATIVES OF 1.2.7.8-DIPHTHALOYLCARBAZOLE

No Drawing. Application filed April 17, 1928, Serial No. 270,791, and in Germany July 13, 1926.

The present invention relates to new derivatives of 1.2.7.8-diphthaloylcarbazole, more particularly to the compounds of the general formula:

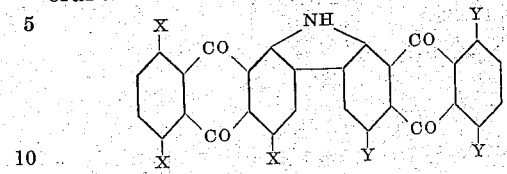

wherein one X and one Y stand for benzoylamino groups, at least one X or one Y for an alkoxy group and the remaining X's and Y's for hydrogen.

In order to manufacture my new dyestuffs I prefer to use as starting materials anthrimids of the general formula:

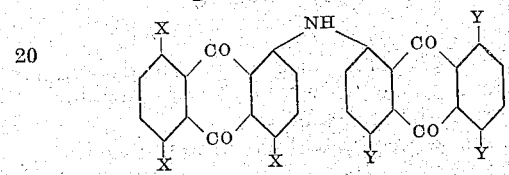

wherein one X and one Y stand for benzoylamino groups, at least one X or one Y for an alkoxy group and the remaining X's and Y's for hydrogen, the manufacture of which is described in U. S. Patent No. 1,730,186, dated October 1, 1929.

By treating these anthrimids with concentrated sulfuric acid of about 90% strength a conversion occurs which is easily perceptible by the change in color. Probably hydrocompounds are formed, which by treatment with oxidizing agents, such as manganese dioxide, sodium nitrite or chromic acid, are converted either directly or after dilution with water into my new 1.2.7.8-diphthaloylcarbazoles of the above given general formula:

The following examples serve to illustrate my invention without limiting it thereto, all parts being by weight:

*Example 1.*—10 parts of the compound of the probable formula:

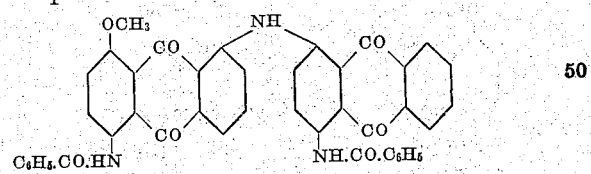

obtainable for instance by condensing 1 benzoylamino-4-hydroxy-5-chloroanthraquinone with 1-benzoylamino-4-aminoanthraquinone and methylating the hydroxy group of the anthrimide thus obtainable by means of toluene sulfonic acid methylester, are poured at a temperature of about 25° C. into 200 parts of sulfuric acid of about 90% strength. The temperature rises to about 40° C. and at first the green color changes after a short time to copper-red. When pouring the copper-red concentrated sulfuric acid solution into water containing sodium nitrate, a red-brown solution is obtained from which cotton is dyed clear red-brown shades of excellent fastness to light and to washing. The dried and isolated dyestuff, which may be obtained from this solution in the usual manner has the formula:

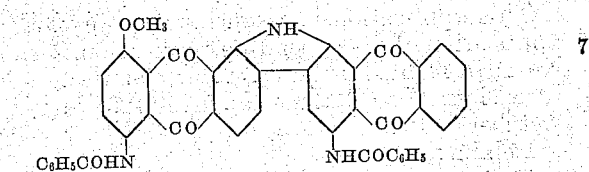

*Example 2.*—10 parts of the anthrimid of the formula:

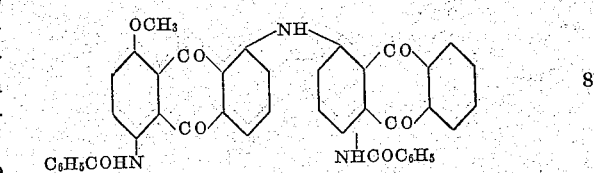

obtainable, for instance, by condensing 1-benzoylamino-4-methoxy-5-chloroanthraquinone with 1-benzoylamino-5-aminoanthraquinone are dissolved in 200 parts of the concentrated sulfuric acid (96%) at a temperature of about 20° C. The temperature rises hereby to 35° C. and at first the olive green color in concentrated sulfuric acid changes to red-brown. When after-treated with an oxidizing agent, such as nitro-sulfuric acid and poured into water a yellow-brown dyestuff in the shape of a paste is obtained. It dyes cotton very strong clear yellow-brown shades of excellent fastness to light and to washing. It has the formula:

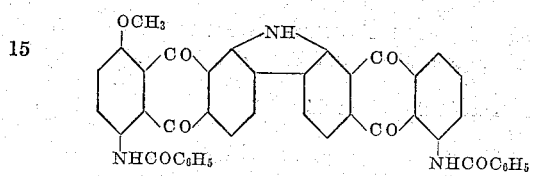

*Example 3.*—10 parts of the anthrimid of the formula:

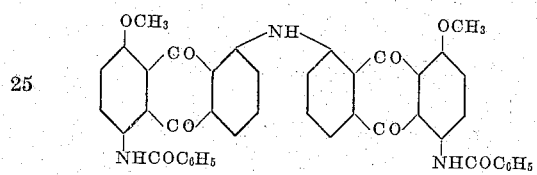

obtainable for instance by condensing 1-benzoylamino-4-methoxy-5-chloroanthraquinone with 1-benzoylamino-4-methoxy-5-aminoanthraquinone are dissolved in 200 parts of sulfuric acid of about 90% strength at a temperature of about 25° C. whereby the temperature rises to 40° C. and the blue-grey color changes very quickly to a red color with a blue hue. When after-treated with concentrated sulfuric acid and manganese dioxide, a dyestuff is obtained which dyes cotton clear red of excellent fastness to light and to washing. It has the formula:

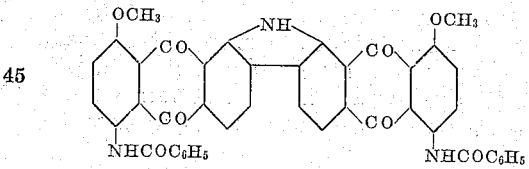

This application is a continuation-in-part application of my copending application, Ser. No. 204,149, filed July 7, 1927, which has matured into U. S. Patent No. 1,730,186, dated October 1, 1929.

I claim:

1. As new products the compounds of the general formula:

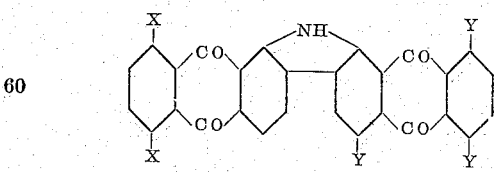

wherein one X and one Y stand for benzoylamino groups, at least one X or one Y for an alkoxy group and the remaining X's and Y's for hydrogen, dyeing cotton orange to red to red-brown shades of excellent clearness and very good fastness to light and to washing.

2. As new products the compounds of the general formula:

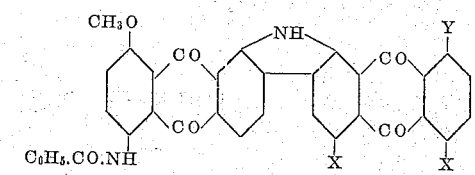

wherein one X represents a benzoylamino group, the other X hydrogen and Y stands for hydrogen or an alkoxy group, dyeing cotton orange to red to red-brown shades of excellent clearness and very good fastness to light and to washing.

3. As a new product the compound of the formula:

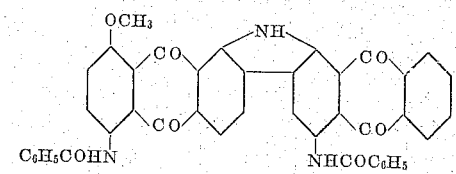

forming a red-brown powder and dyeing cotton clear red-brown shades of excellent fastness to light and washing.

4. As a new product, the compound of the formula:

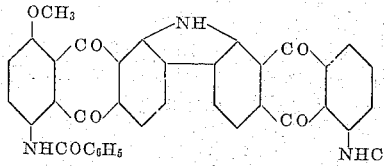

forming a yellow-brown powder and dyeing cotton clear yellow-brown shades of excellent fastness to light and washing.

5. As a new product, the compound of the formula:

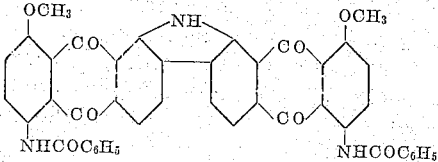

forming a red powder and dyeing cotton clear red shades of excellent fastness to light and washing.

In testimony whereof I have hereunto set my hand.

FRITZ BAUMANN.

Certificate of Correction

Patent No. 1,885,172.  November 1, 1932.

FRITZ BAUMANN

It is hereby certified that error appears in the printed specification of the above-numbered patent requiring correction as follows: Page 1, lines 82 to 88, strike out the formula and insert instead—

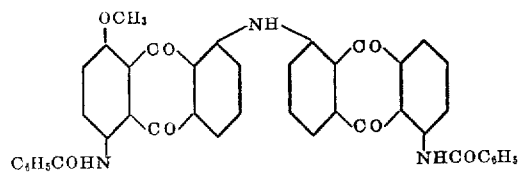

and that the said Letters Patent should be read with this correction therein that the same may conform to the record of the case in the Patent Office.

Signed and sealed this 17th day of January, A. D. 1933.

[SEAL.]

M. J. MOORE,
*Acting Commissioner of Patents.*